(No Model.)
H. KNIGHT.
HARROW AND LAND LEVELER.
No. 415,645. Patented Nov. 19, 1889.
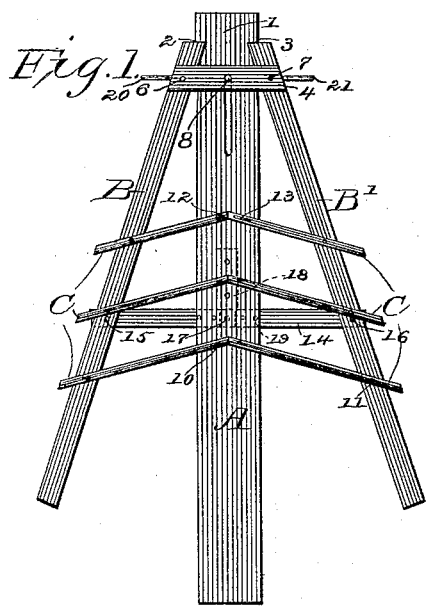
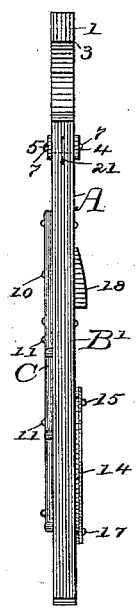
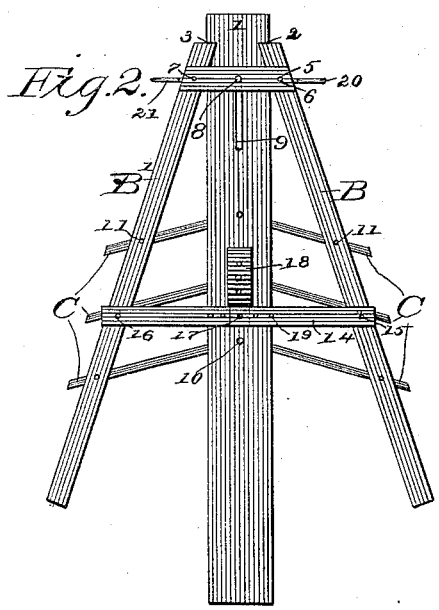
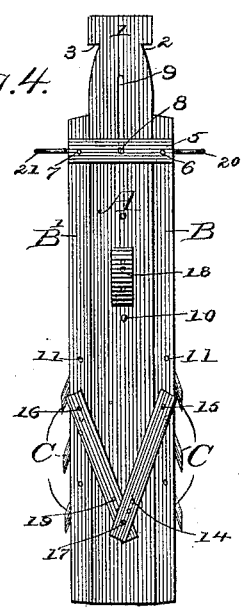
WITNESSES
Wm. Musser.
B. W. Sommers.
INVENTOR
Horace Knight.
by A. G. Heylmun,
Attorney.

UNITED STATES PATENT OFFICE.

HORACE KNIGHT, OF PARIS, MAINE.

HARROW AND LAND LEVELER.

SPECIFICATION forming part of Letters Patent No. 415,645, dated November 19, 1889.

Application filed August 2, 1889. Serial No. 319,543. (No model.)

*To all whom it may concern:*

Be it known that I, HORACE KNIGHT, a citizen of the United States of America, residing at Paris, in the county of Oxford and State of Maine, have invented certain new and useful Improvements in Harrows and Land-Levelers, of which the following is a specification.

The object of my invention is to provide an improved harrow and land-leveler for harrowing land in the process of cultivation, leveling roads and highways, pulverizing soil, &c., and at the same time to provide an implement for the purpose stated which is cheap and simple in construction and which may be folded up for convenience in storing and transporting.

Reference being had to the accompanying drawings, wherein my invention is fully illustrated, Figure 1 is a bottom plan view of my improved harrow and land-leveler. Fig. 2 is a top view. Fig. 3 is a side view. Fig. 4 is a view showing the harrow folded or the parts swung together.

A designates a central draft-bar cut away near its front end, forming a head-piece 1 and two shoulders 2 3, substantially as shown, and for the purpose as will be hereinafter specified.

B B' are two adjustable swinging wings or side bars pivotally connected at their front end to two parallel coupling-pieces 4 5 by means of bolts 6 7. These coupling-pieces are connected by means of a central bolt 8, constituting a king or draft bolt, which projects through a longitudinally-arranged slot 9 in the front end of the draft-bar A, substantially as shown.

C designates a series of bars forming scrapers or levelers, made in the form substantially as shown, and arranged substantially parallel to each other and pivoted to the central draft-bar A and side bars B B' by means of bolts 10 and 11. These scrapers are arranged, as stated, substantially parallel to each other and inclined outwardly from their connection to the draft-bar, so as to have a shearing function in relation to the surface to be acted on. Where the two front scrapers are connected to the central draft-bar, they are provided with slots 12 13, to allow a sliding movement and prevent them from binding when the side bars are extended or closed.

On the top of the harrow is a brace or spreader 14, pivotally secured to the two side bars by means of bolts 15 16 and hinged or pivoted together at its center by a pin or bolt 17. When the spreader-brace is opened, it throws the side bars out and at the same time throws them forward until the ends lodge against the shoulders 2 3 of the head-piece, and the brace is prevented from further forward movement by the stop-block 18, secured on the draft-bar. This brace or spreader is provided with bolt-holes 19, by means of which it may be made longer or shorter, as desired, thus increasing or decreasing the width of the harrow.

To the sides of the side bars I attach hooks or bolts, as at 20 and 21, which may be of any suitable design, and to these the draft loop or bail is connected, as shown.

The operation of the implement is as follows: The side bars are drawn outward until the spreader-brace is extended and lodges against the stop-block on the central bar, which movements bring the ends of the side bars into engagement with the notches of the central bar, when the implement is ready for use. The same condition of operativeness is attained by simply drawing on the draft-connections, which pulls the parts into position, and, having a small outward leverage, pulls the side bars outward and spreads the scraper-bars.

Having thus described my invention, what I claim as new, and desire to secure by Letters Patent, is—

1. In a land-leveler, the combination of the central draft-bar A, provided with a head-piece 1, having the shoulders 2 3, the parallel coupling-pieces 4 5, the adjustable swinging wings or side bars B B', pivoted to the said coupling-pieces and provided with the spreader-brace 14, and the obliquely-arranged scraper-bars having their inner ends pivoted to the central bar and their outer ends pivoted to the side bars, substantially as described.

2. In a land-leveler, the combination of the central draft-bar A, provided with a head-piece 1, having the shoulders 2 3, and the longitudinal slot 9, the parallel coupling-pieces 4 5, connected by the bolt 8, projecting through the longitudinally-arranged slot 9, the adjustable swinging wings or side bars B B', the spreader-brace 14, and the stop-block 18, substantially as described.

In witness whereof I hereunto set my hand in the presence of two attesting witnesses.

HORACE KNIGHT.

Attest:
EPHRAIM H. BROWN,
JAMES A. SHEDD.